United States Patent
Ujiie et al.

(10) Patent No.: US 9,977,640 B2
(45) Date of Patent: May 22, 2018

(54) IMAGE DISPLAY DEVICE, IMAGE TRANSMISSION DEVICE, AND IMAGE DISPLAY SYSTEM USING THESE DEVICES

(71) Applicant: MITSUBISHI ELECTRIC CORPORATION, Tokyo (JP)

(72) Inventors: Junya Ujiie, Tokyo (JP); Ken Miyamoto, Tokyo (JP); Masahiro Abukawa, Tokyo (JP)

(73) Assignee: MITSUBISHI ELECTRIC COPRORATION, Tokyo (JP)

( * ) Notice: Subject to any disclaimer, the term of this patent is extended or adjusted under 35 U.S.C. 154(b) by 54 days.

(21) Appl. No.: 14/771,250

(22) PCT Filed: May 29, 2013

(86) PCT No.: PCT/JP2013/064926
§ 371 (c)(1),
(2) Date: Aug. 28, 2015

(87) PCT Pub. No.: WO2014/192102
PCT Pub. Date: Dec. 4, 2014

(65) Prior Publication Data
US 2016/0011838 A1  Jan. 14, 2016

(51) Int. Cl.
*G06F 3/14* (2006.01)
*G09G 5/00* (2006.01)
(Continued)

(52) U.S. Cl.
CPC ............ *G06F 3/14* (2013.01); *G01C 21/362* (2013.01); *G01C 21/3688* (2013.01);
(Continued)

(58) Field of Classification Search
None
See application file for complete search history.

(56) References Cited

U.S. PATENT DOCUMENTS

| 2003/0069689 A1 | 4/2003 | Ihara et al. |
| 2006/0106534 A1* | 5/2006 | Kawamata ............ G01C 21/32 701/532 |

(Continued)

FOREIGN PATENT DOCUMENTS

| JP | 3-179494 A | 8/1991 |
| JP | 11-249555 A | 9/1999 |

(Continued)

*Primary Examiner* — Ke Xiao
*Assistant Examiner* — Jed-Justin Imperial
(74) *Attorney, Agent, or Firm* — Birch, Stewart, Kolasch & Birch, LLP

(57) ABSTRACT

An image display system 1 in accordance with the present invention is configured with a navigation device 2 and an image display device 4 which are connected to each other via a network 3. The navigation device 2 transmits a drawing setting for specifying a method of drawing a vertex string showing a feature of a component of an image when a network connection with the image display device 4 is established, and transmits image data including the vertex string when the image display device draws an image, and the image display device receives the drawing setting from the image transmission device, corrects the drawing setting on the basis of the display ability of the image transmission device and its own display ability, and, when receiving the image data from the image transmission device, draws and display the image by using the above-mentioned drawing setting corrected thereby.

7 Claims, 11 Drawing Sheets

| Drawing Setting Storage | | | | | |
|---|---|---|---|---|---|
| Drawing Setting ID | 1 | 2 | 3 | 4 | |
| Graphic Type | Line Segment | Polygon | Curved Line | Ellipse | |
| Line Color | Black | Green | Red | Green | |
| Line Thickness | 1 | 4 | 3 | 2 | ... |
| Line Type | Solid Line | Broken Line | Solid Line | Solid Line | |
| Fill Setting | (Null) | Green | (Null) | Blue | |
| Display Priority | 100 | 50 | 70 | 80 | |
| Drawing Enable or Disable Flag | Enabled | Enabled | Enabled | Enabled | |

(51) Int. Cl.
*G09G 5/36* (2006.01)
*G01C 21/36* (2006.01)
*G06T 1/00* (2006.01)

(52) U.S. Cl.
CPC ............ G06T 1/0007 (2013.01); G09G 5/00 (2013.01); G09G 5/36 (2013.01)

(56) References Cited

U.S. PATENT DOCUMENTS

| | | | | |
|---|---|---|---|---|
| 2009/0278871 | A1* | 11/2009 | Lewis | G06F 3/1462 345/698 |
| 2013/0038900 | A1* | 2/2013 | Henry | G06F 3/1215 358/1.15 |
| 2013/0147846 | A1* | 6/2013 | Kalai | G06T 1/60 345/660 |

FOREIGN PATENT DOCUMENTS

| | | |
|---|---|---|
| JP | 2003-75167 A | 3/2003 |
| JP | 2003-90731 A | 3/2003 |
| JP | 2004-318124 A | 11/2004 |
| JP | 2005-196348 A | 7/2005 |
| JP | 2005-201802 A | 7/2005 |
| JP | 2006-273060 A | 10/2006 |
| JP | 2008-233649 A | 10/2008 |
| JP | 4413630 B2 | 2/2010 |
| JP | 4742507 B2 | 8/2011 |
| JP | 4903366 B2 | 3/2012 |

* cited by examiner

FIG.2

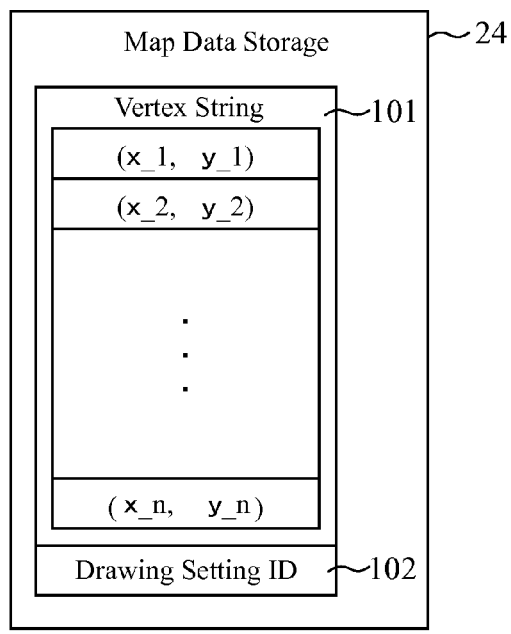

Map Data Storage — 24
Vertex String — 101
(x_1, y_1)
(x_2, y_2)
.
.
.
(x_n, y_n)
Drawing Setting ID — 102

FIG.3

Drawing Setting Storage — 25

| Drawing Setting ID | 1 | 2 | 3 | 4 | |
|---|---|---|---|---|---|
| Graphic Type | Line Segment | Polygon | Curved Line | Ellipse | |
| Line Color | Black | Green | Red | Green | |
| Line Thickness | 1 | 4 | 3 | 2 | ... |
| Line Type | Solid Line | Broken Line | Solid Line | Solid Line | |
| Fill Setting | (Null) | Green | (Null) | Blue | |
| Display Priority | 100 | 50 | 70 | 80 | |
| Drawing Enable or Disable Flag | Enabled | Enabled | Enabled | Enabled | |

IMAGE DISPLAY DEVICE, IMAGE TRANSMISSION DEVICE, AND IMAGE DISPLAY SYSTEM USING THESE DEVICES

FIELD OF THE INVENTION

The present invention relates to an image display device that displays an image, an image transmission device, and an image display system using these devices.

BACKGROUND OF THE INVENTION

Conventionally, an embedded device that performs map drawing, such as a car navigation system, is typically configured so as to integrally include a storage having map data used for drawing therein, a drawing device to draw a map, and a display device to display the map. On the other hand, because there are a case in which the number of display devices in a car navigation system is increased to two or more and a case in which a map is displayed also on an information device carried in by a passenger (e.g., a tablet computer or the like), there is an increasing demand to separate a display device from a storage having map data therein.

In recent years, since improvements in the processing capabilities of embedded devices have been provided and it has become popular for embedded devices to have a network connection function, the storage, the drawing device, and the display device can be disposed separately as pieces of independent equipment, respectively. However, when a map image itself is transmitted to the display device via a network, the amount of data transmitted increases. In a car in which a car navigation system is mounted, because it is typical to use a network used for transmission of a map image also for transmission of other data, a reduction of the influence upon other communications by reducing the amount of data transmitted as much as possible is desired.

Further, in the case of separately disposing the storage, the drawing device, and the display device as pieces of independent equipment, respectively, there is a case in which information about the resolution which is originally consistent among the devices becomes inconsistent. For example, there can be a case in which only the display device is replaced by a one having a higher or lower resolution. Even in such a case, displaying an image in such a way that the image is legible to the user of the car navigation system is desired.

As a system that displays such a map, patent reference 1 discloses a technique of dividing data required for map drawing into part data required for display and drawing data including screen component data, and also reducing the amount of data transmitted by not retransmitting part data which are already transmitted.

Further, patent reference 2 discloses a vehicle-mounted information system that can display, on each of display devices having different image display capabilities, an image having an amount of information which is suitable for the image display capability by performing a process of making the image contents to be displayed on the display device have the amount of information suitable for the image display capability on the basis of the information about the image display capability.

RELATED ART DOCUMENT

Patent Reference

Patent reference 1: Japanese Unexamined Patent Application Publication No. 2006-273060

Patent reference 2: Japanese Unexamined Patent Application Publication No. 2005-201802

SUMMARY OF THE INVENTION

Problems to be Solved by the Invention

However, in the technique disclosed by patent reference 1, the part data are only arranged on the screen on the basis of the drawing data, while no mention is made of the resolution of the display device. Therefore, in the case of replacing the display device with a one having a different resolution, there is a problem that the technique cannot deal with the replacement.

Further, although map drawing which is adjusted to the image display capability of the display device can be performed according to the technique disclosed by patent reference 2, data which are transmitted to a rear seat display are an image signal or data for drawing, and map drawing is performed by using only the data. Therefore, there remains a problem that the amount of data transmitted is large.

The present invention is made in order to solve the above-mentioned problems, and it is therefore an object of the present invention to provide an image display device that can reduce the amount of data transmitted to an image display device, and can also display an image in such a way that the image is legible to the user of the image display system, an image transmission device, and an image display system using these devices.

Means for Solving the Problem

In accordance with the present invention, there is provided an image display device including: a drawing setting storage to store a drawing setting for specifying a method of drawing a component of an image; a controller to correct the drawing setting on the basis of both the display ability of an image data provider and its own display ability, and to draw an image by using the drawing setting corrected thereby; and a display to display the image drawn by the controller.

Further, in accordance with the present invention, there is provided an image transmission device that transmits image data to an image display device, the image transmission device including: an image data storage to store image data including data for drawing a component of an image; a drawing setting storage to store a drawing setting for specifying a method of drawing the component of the image; and a controller to transmit the drawing setting when a network connection with the image display device is established, and to transmit the image data when the image display device draws the image.

Further, in accordance with the present invention, there is provided an image display system in which an image transmission device and an image display device are connected to each other via a network, in which the image transmission device transmits a drawing setting for specifying a method of drawing a component of an image when a network connection with the image display device is established, and transmits image data including data for drawing the component of the image when the image display device draws the image, and in which the image display device receives the drawing setting from the image transmission device, and corrects the drawing setting on the basis of both the display ability of the image transmission device and its own display ability, and, when receiving the image data from the image transmission device, draws and displays the image by using the drawing setting corrected thereby.

Advantages of the Invention

In accordance with the present invention, there can be provided an image display system that can reduce the amount of data transmitted to an image display device and that can display an image legible to the user.

BRIEF DESCRIPTION OF THE FIGURES

FIG. 2 is a diagram showing an example of a set of a vertex string and a drawing setting ID which is stored in a map data storage of the image display system in accordance with Embodiment 1 of the present invention;

FIG. 3 is a diagram showing an example of drawing settings stored in a drawing setting storage of the image display system in accordance with Embodiment 1 of the present invention;

EMBODIMENTS OF THE INVENTION

Hereafter, the preferred embodiments of the present invention will be explained in detail with reference to the drawings.

Embodiment 1

Figure 1:
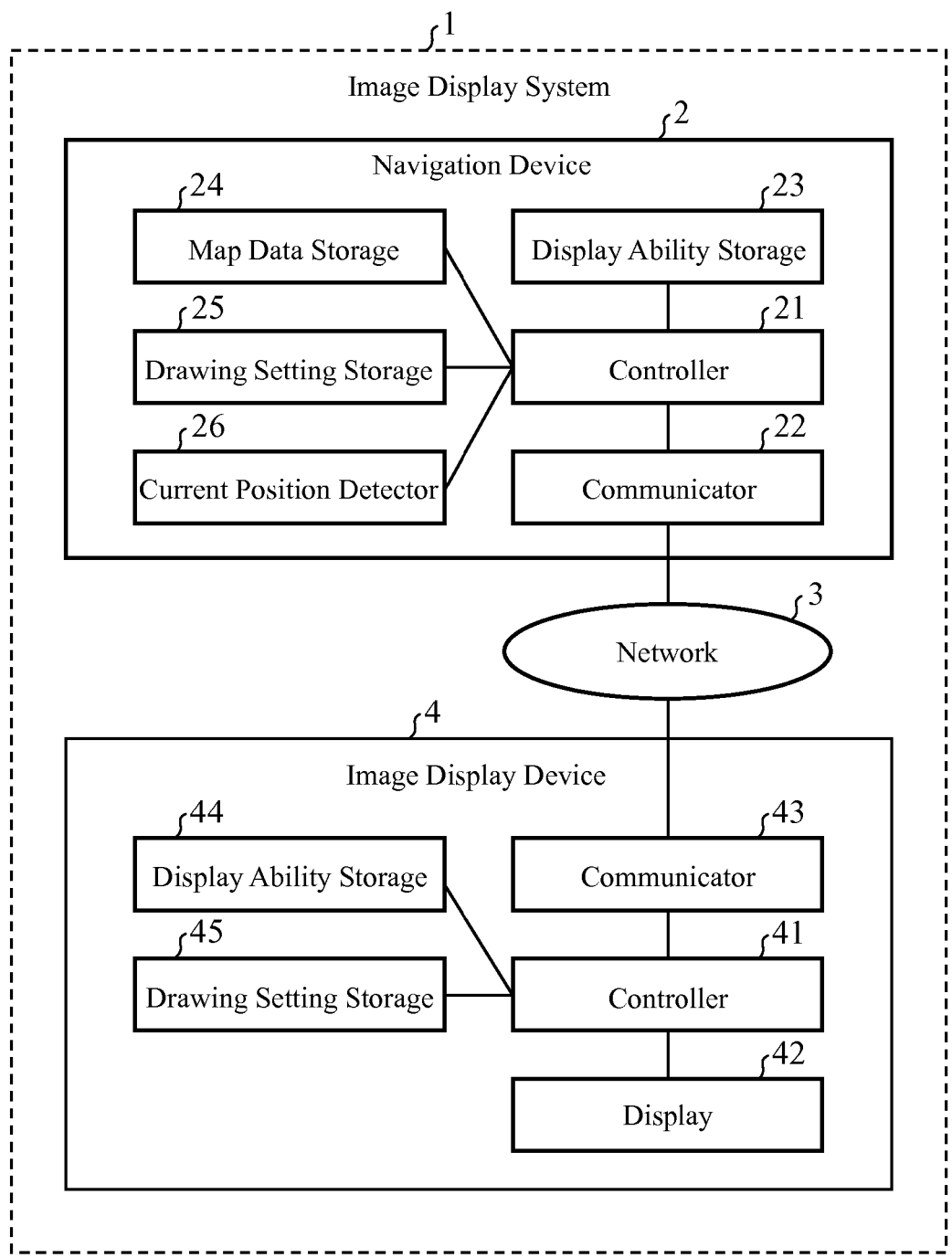
FIG. 1 is a block diagram showing the configuration of an image display system in accordance with Embodiment 1 of the present invention.

FIG. 1 is a block diagram showing the configuration of an image display system 1 in accordance with Embodiment 1 of the present invention. This image display system 1 is configured by connecting a navigation device 2 and an image display device 4 to each other via a network 3. The navigation device 2 corresponds to an image transmission device in accordance with the present invention. The network 3 connects between the navigation device 2 and the image display device 4 by using a cable or by radio. Although an explanation will be made assuming that the navigation device 2 transmits map data as an example of image data, and the image display device 4 displays a map image as an example of an image, this embodiment is not limited to this example.

First, the navigation device 2 will be explained. The navigation device 2 includes a controller 21 (first controller 21), a communicator 22, a display ability storage 23, a map data storage 24 (corresponding to an "image data storage" in accordance with the present invention), a drawing setting storage 25, and a current position detector 26.

The controller 21 performs a navigation process by using current position information sent thereto from the current position detector 26, map data acquired from the map data storage 24, and so on. Because map drawing which is a part of the navigation process is performed by the image display device 4, the controller 21 transmits data required for the map drawing to the image display device 4 by using the communicator 22.

The communicator 22 controls transmission and reception of data between the navigation device and the image display device 4 (strictly, a communicator 43 of the image display device 4) via the network 3. More specifically, the communicator 22 transmits data from the controller 21 to the image display device 4 via the network 3, and also receives data transmitted thereto, via the network 3, from the image display device 4 and sends the data to the controller 21.

The display ability storage 23 stores the display ability of a display which the navigation device 2 has. The "display ability" means, for example, a screen resolution, the size of the display, and so on. In this Embodiment 1, because an explanation about display on the display disposed in the navigation device 2 will be omitted hereafter, an illustration of the display is omitted from FIG. 1.

The map data storage 24 stores map data, and sends the map data about a specified range to the controller 21 in response to a request from the controller 21. In this Embodiment 1, data required for map drawing are divided into a "vertex string" to define the vertices of a map element, such as a line segment or a polygon, and a "drawing setting" to specify a method of drawing the element defined by the vertex string. In the map data storage 24, a plurality of sets each consisting of a vertex string and a drawing setting ID for uniquely specifying a drawing setting are stored. In this embodiment, it can be said that a vertex string shows the feature points of a component of a map image. Further, a component is an image of a house which constructs a map image, as an example. When a component is, for example, a house, the feature points of the component show a coordinate group for drawing lines, curved lines, graphics, and so on which are required in order to form an image of the house. Further, the coordinate group is not limited to the coordinates of parts, such as graphics, and can be alternatively a coordinate group which forms parts of the house (a roof and so on), or a coordinate group for forming the house itself.

FIG. 2 is a diagram showing an example of a set of a vertex string and a drawing setting ID, which is stored in the map data storage 24. In the map data storage 24, a set of a vertex string 101 and a drawing setting ID 102 is stored for each graphic to be drawn. A vertex string 101 includes one or more feature points of a graphic (in the case of a polygon, vertices) in a form of two-dimensional coordinates. A drawing setting ID 102 is a value for uniquely specifying a drawing setting.

The drawing setting storage 25 stores drawing settings. Each drawing setting includes instructions, such as a graphic type (a line segment, a polygon, or a curved line), a line color, a line thickness, a line type (a solid line or a broken line), a fill setting, a display priority, and a drawing enable or disable flag. Further, a drawing setting ID as mentioned above is provided for each drawing setting. Each drawing setting stored in this drawing setting storage 25 is read by the controller 21.

FIG. 3 is a diagram showing an example of the drawing settings stored in the drawing setting storage 25. In the example of FIG. 3, only four drawing settings each of which is a set of a drawing setting ID, a graphic type, a line color, a line thickness, a line type, a fill setting, a display priority, and a drawing enable or disable flag are shown. The items of each drawing setting shown in FIG. 3 are provided as an example, and another setting item can be added as needed and a setting item can be removed from the setting items shown in FIG. 3 as needed.

The current position detector 26 is configured with, for example, a GPS (Global Positioning System) receiver and so on, and detects the current position of a vehicle in which the navigation device 2 is mounted, and sends the current position to the controller 21 as current position information.

Next, the image display device 4 will be explained. The image display device 4 includes a controller 41 (second controller 41), a display 42, the communicator 43, a display ability storage 44, and a drawing setting storage 45.

The controller 41 draws a map (map image) by using the map data received, via the network 3 and the communicator 43, from the navigation device 2. Drawing data showing the map drawn by this controller 41 are sent to the display 42. The display 42 displays the map according to the drawing data sent thereto from the controller 41.

The communicator 43 controls transmission and reception of data between the image display device and the navigation device 2 (strictly, the communicator 22 of the navigation device 2) via the network 3. More specifically, the communicator 43 transmits data from the controller 41 to the navigation device 2 via the network 3, and also receives data transmitted thereto, via the network 3, from the navigation device 2 and sends the data to the controller 43.

The display ability storage 44 stores the display ability sent thereto from the navigation device 2, and the display ability of the image display device 4 itself (its own display ability). The display abilities stored in the display ability storage 44 are read by the controller 41.

The drawing setting storage 45 stores the drawing settings sent thereto from the navigation device 2, and a coordinate setting which will be described below. The drawing setting and the coordinate setting which are stored in this drawing setting storage 45 are read by the controller 41.

Next, the operation of the image display system 1 in accordance with Embodiment 1 configured as above will be explained by dividing the operation into a one at the time of turning on and a one at the time of map drawing.

(1-1) Operation at the Time of Turning on

Figure 4:
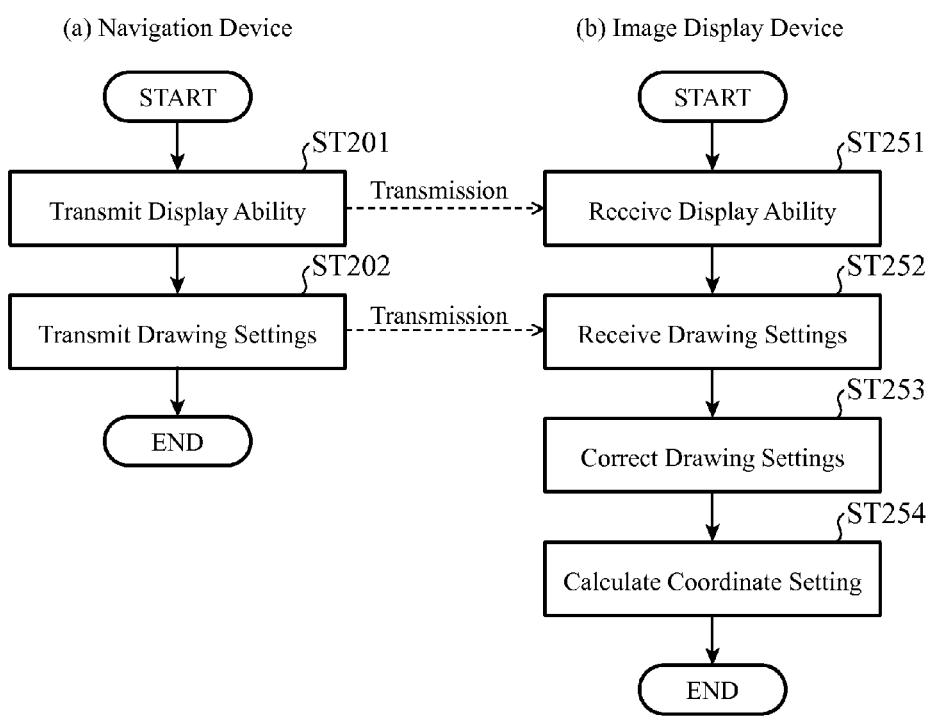
FIG. 4 is a flow chart showing an operation at the time of turning on of the image display system in accordance with Embodiment 1 of the present invention.

First, an operation at the time when the image display system 1 is started by being turned on, and a connection between the navigation device 2 and the image display device 4 is established will be explained by referring to a flow chart shown in FIG. 4.

First, the operation of the navigation device 2 will be explained by referring to a flow chart shown in FIG. 4(a). When a connection between the navigation device 2 and the image display device 4 is established by the turning-on of the power to the system, transmission of the display ability is performed (step ST201). More specifically, the controller 21 acquires its own display ability (the display ability of the navigation device 2) from the display ability storage 23, and transmits the display ability to the image display device 4 via the communicator 22 and the network 3.

Transmission of the drawing settings is then performed (step ST202). More specifically, the controller 21 acquires the drawing settings from the drawing setting storage 25, and transmits the drawing settings to the image display device 4 via the communicator 22 and the network 3. After the above-mentioned processes are performed, the processing in the navigation device 2 is ended. Although the explanation of the operation at the time of turning on is made above, the navigation device 2 does not necessarily have to transmit the display ability thereof and the drawing settings immediately after the power to the system is turned on, and the navigation device has only to transmit the display ability thereof and the drawing settings before the image display device 4 draws a map image. In the following, the same goes for a case in which an explanation is made as to an operation at the time of turning on.

Next, the operation of the image display device 4 will be explained by referring to a flow chart shown in FIG. 4(b). When a connection between the navigation device 2 and the image display device 4 is established by the turning-on of the power to the system, reception of the display ability is performed first (step ST251). More specifically, the controller 41 receives the display ability transmitted, in step ST201, from the navigation device 2 via the network 3 and the communicator 43, and stores the display ability in the display ability storage 44 as a "map data provider display ability."

Reception of the drawing settings is then performed (step ST252). More specifically, the controller 41 receives the drawing settings transmitted, in step ST202, from the navigation device 2 via the network 3 and the communicator 43, and stores the drawing settings in the drawing setting storage 45 as the "drawing settings before correction."

A correction on the drawing settings is then performed (step ST253). More specifically, the controller 41 corrects the drawing settings by using the map data provider display ability stored, in step ST251, in the display ability storage 44, the drawing settings before correction stored, in step ST252, in the drawing setting storage 45, and the "display ability of the image display device 4 itself" stored in advance in the display ability storage 44. More specifically, the controller 41 corrects the drawing settings before correction transmitted from the navigation device 2 on the basis of the display ability of the navigation device 2 which is the provider of the map data, and its own display ability. The results of this correction are stored in the drawing setting storage 45 as the "drawing settings after correction."

Calculation of a coordinate setting is then performed (step ST254). More specifically, the controller 41 calculates a vertical ratio and a horizontal ratio by using the vertical and horizontal values of the screen resolution included in the "map data provider display ability" and those included in the "display ability of the image display device 4 itself", and stores the two calculation results in the drawing setting storage 45 as a "coordinate setting." As the denominators used at the time of calculating the ratios, the values of the "map data provider display ability" are used. After the above-mentioned processes are performed, the processing in the image display device 4 is ended.

Hereafter, an example of a concrete method of correcting the drawing settings which is executed in step ST253 will be explained. It is assumed that the screen height-to-width ratio of the "map data provider display ability" is the same as that of the "display ability of image display device 4 itself."

First, a line thickness which is one item of each of the drawing settings before correction is multiplied by the result of calculation according to the following equation (1). As a result, the line thickness can be corrected to a line thickness suitable for the image display device 4. The screen resolution which is used here is the number of dots in height or width.

$$Rd \div Rb \quad (1)$$

where Rd denotes the screen resolution of the image display device 4 itself, and Rb denotes the screen resolution of the map data provider.

Next, when making the line thickness be the same in length, instead of in the number of dots, what is necessary is just to make a calculation according to the following equation (2) by also using the size of the display in addition to the screen resolution, and multiply the line thickness which is one item of each of the drawing settings before correction by the calculation result.

$$(WNinch/WNdot) \times (WDdot/WDinch) \quad (2)$$

where WNinch denotes the horizontal width (unit: inch) of the navigation device 2, WNdot denotes the horizontal width (unit: dot) of the navigation device 2, WDdot denotes the horizontal width (unit: dot) of the image display device 4, and WDinch denotes the horizontal width (unit: inch) of the image display device 4.

When the value which is the result of correcting a drawing setting is less than a predetermined threshold or is inversely greater than the predetermined threshold, instead of the corrected value itself, the threshold can be used instead as the drawing setting after correction. Further, according to a display priority included in each of the drawing settings, as to a specific drawing item, the drawing enable or disable flag can be changed to "disabled" (the drawing enable or disable flags of all drawing items are usually set to "enabled").

(1-2) Operation at the Time of Map Drawing

Figure 5:
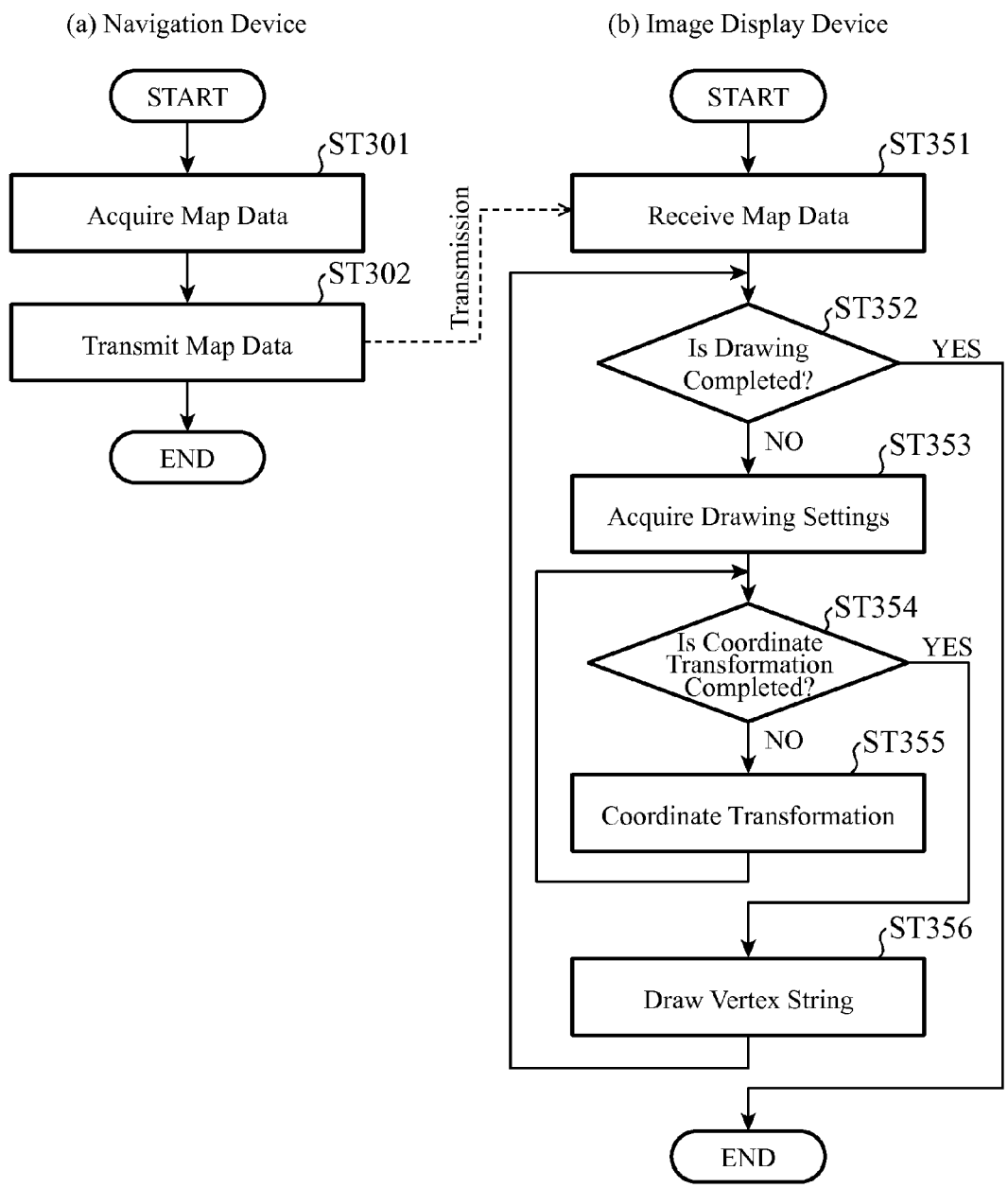
FIG. 5 is a flow chart showing an operation at the time of map drawing of the image display system in accordance with Embodiment 1 of the present invention.

Next, the operation of the image display system 1 at the time of performing map drawing after the operation at the time of turning on is completed will be explained by referring to a flow chart shown in FIG. 5.

First, the operation of the navigation device 2 will be explained by referring to a flow chart shown in FIG. 5(a). A requirement on "start" of the processing shown in FIG. 5(a) is that current position information is sent from the current position detector 26 to the controller 21, and the controller 21 determines that the map screen displayed on the image display device 4 needs to be updated on the basis of the current position information.

When the processing is started, map data are acquired (step ST301). More specifically, the controller 21 acquires map data about an area surrounding the point shown by the current position information from the map data storage 24 when the current position information is sent thereto from the current position detector 26. The map data acquired at that time are configured with one or more sets each consisting of a vertex string and a drawing setting ID for specifying a drawing setting uniquely (referred to as "vertex string information" from here on). In this Embodiment 1, it is assumed that the acquired map data express an area matching the screen resolution of the display of the navigation device 2, the screen resolution being stored in the display ability storage 23.

The map data are then transmitted (step ST302). More specifically, the controller 21 transmits the map data including the vertex strings acquired in step ST301, via the communicator 22 and the network 3, to the image display device 4. After the above-mentioned processes are performed, the operation of the navigation device 2 is ended.

Next, the operation of the image display device 4 will be explained by referring to a flow chart shown in FIG. 5(b). When the processing is started, the map data are received first (step ST351). More specifically, the controller 41 receives the map data transmitted thereto, via the network 3 and the communicator 43, from the navigation device 2.

Whether or not the drawing is completed is then checked to see (step ST352). More specifically, the controller 41 checks to see whether or not the drawing based on all pieces of vertex string information included in the map data received in step ST351 is completed. When it is determined in this step ST352 that the drawing is completed, the display 42 displays the map image drawn by the controller 41 and the processing in the image display device 4 is ended.

In contrast, when it is determined in step ST352 that the drawing is not completed, drawing setting information is then acquired (step ST353). More specifically, the controller 41 acquires the corresponding drawing setting after correction from the drawing setting storage 45 by using the drawing setting ID included in each vertex string information which constructs the map data received in step ST351. The controller 41 also acquires the coordinate setting from the drawing setting storage 45.

Whether or not coordinate transformation is completed is then checked to see (step ST354). More specifically, the controller 41 checks to see whether or not coordinate transformation is completed for each of all the vertices included in the vertex string information.

When it is determined in this step ST354 that the coordinate transformation is not completed, coordinate transformation is then performed (step ST355). More specifically, the controller 41 acquires the coordinate setting from the drawing setting storage 45, and corrects the coordinate values of each of the vertices included in the vertex string by using the acquired coordinate setting. For example, when the screen resolution of the display ability of the map data provider is 480 dots in height and 800 dots in width, and the screen resolution of the image display device 4 is 600 dots in height and 1,000 dots in width, because the coordinate setting is expressed by 600÷480=1.25 in height and 1,000÷800=1.25 in width, the coordinate values of each of the vertices are multiplied by 1.25. After that, the controller returns to the process of step ST354.

When it is determined in above-mentioned step ST354 that the coordinate transformation is completed, drawing of the vertex string is then performed (step ST356). More specifically, the controller 41 draws the vertex string on which the correction is completed on the display 42 by using the drawing setting after correction acquired in step ST353. When the drawing enable or disable flag of the drawing setting after correction is "disabled", the controller, in step ST354, determines that the coordinate transformation is completed, and then advances to step ST356.

As explained above, the navigation device 2 of the image display system 1 in accordance with Embodiment 1 transmits drawing settings before the image display device 4 draws a map, for example, at the time of turning on (when a network connection with the image display device 4 is established), and the image display device 4 corrects the drawing settings received thereby on the basis of both the display ability of the navigation device 2, and its own display ability. Then, at the time of map drawing, the image display device 4 draws a map for map data received thereby by using the corrected drawing settings. Because the drawing settings are transmitted to the image display device 4 only before map drawing, but no drawing setting is transmitted at the time of performing map drawing, in this way, the amount of data transmitted from the navigation device 2 to the image display device 4 can be reduced.

Further, because the coordinates and the drawing settings are corrected in consideration of both the display ability of the navigation device 2 and the display ability of the image display device 4, map drawing suitable for each of the various display abilities which the image display device has can be implemented, and an image legible to the user can be displayed. In addition, when the correction on the drawing settings yields a correction result which is greater or less than the threshold, by using the threshold as the correction result, or changing the display enable or disable flag on the basis of the display priority, map drawing suitable for the image display device 4 can be implemented. For example, when the screen resolution of the image display device 4 is small, an adjustment process of drawing line segments corresponding to major thoroughfares, but not drawing line segments corresponding to alleyways can be performed.

In addition, although the necessity of map drawing is determined on the basis of the current position information in above-mentioned Embodiment 1, information about a position which is desired to be displayed can be used instead of the current position information. As a result, a function of scrolling the map screen according to the user's operation and so on can be implemented.

Although in this Embodiment 1, the image display system 1 in which the navigation device 2 and the image display device 4 are connected to each other via the network 3 is explained, the image display system can be modified in such a way that a part of the functions of the navigation device 2 can be implemented by another device. For example, the image display system can be configured in such a way that, in the vehicle, a mobile terminal, such as a smart phone, and the image display device are connected to each other via the network, and an application for navigation operating on the smart phone uses map data and drawing settings which exist in a server on the Internet.

Figure 6:
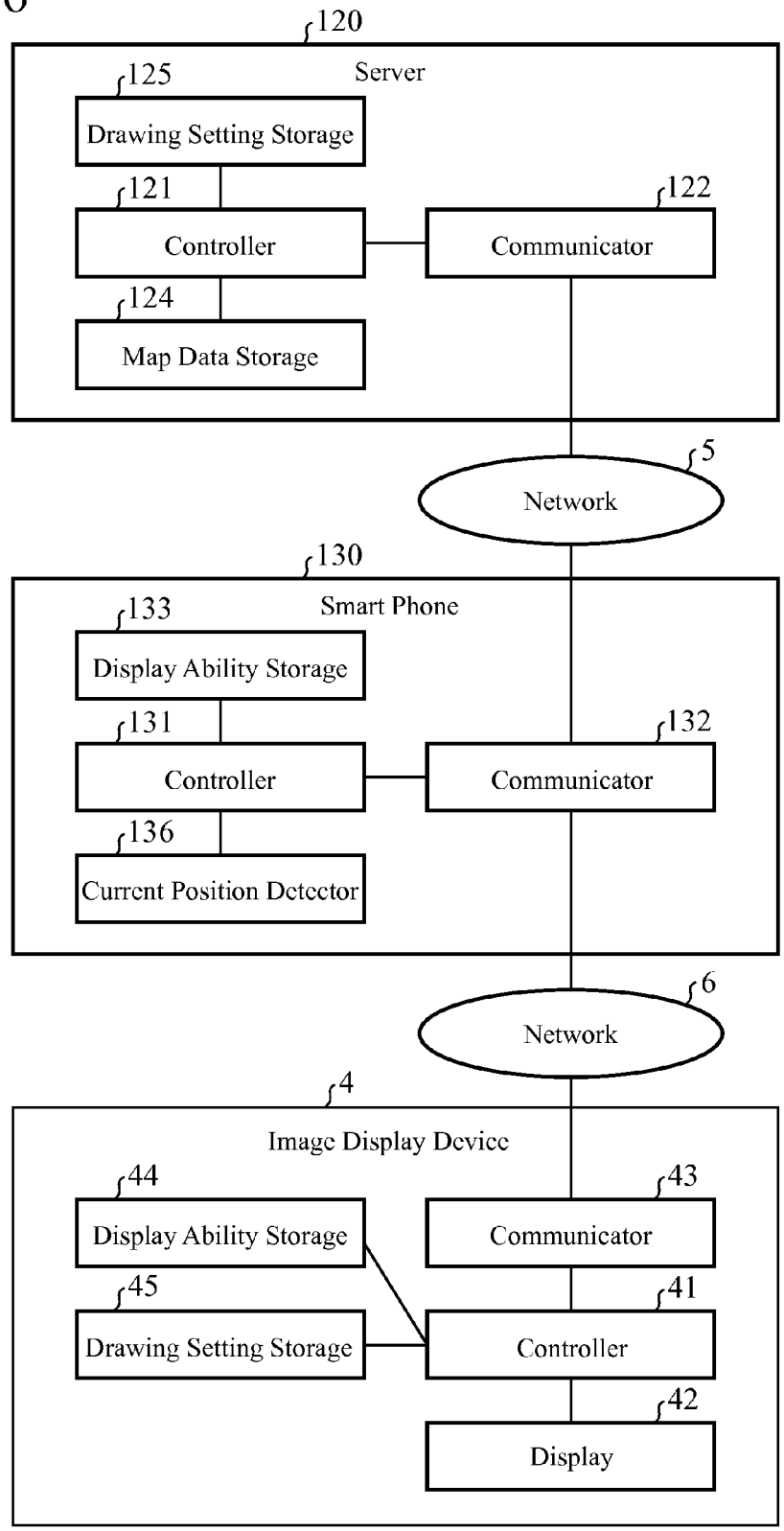
FIG. 6 is a block diagram showing the configuration of an image display system in accordance with a variant of Embodiment 1 of the present invention.

FIG. 6 is a block diagram showing an image display system in accordance with a variant of Embodiment 1 which is configured in such a way that the following two devices: a server 120 and a smart phone 130 share the functions of the navigation device 2. In the image display system in accordance with this variant, the server 120 and the smart phone 130 correspond to an image transmission device in accordance with the present invention.

In this image display system, the server 120 is connected to the smart phone 130 via a network 5, and an image display device 4 is connected to the smart phone 130 via a network 6. Each of the networks 5 and 6 can consist of a cable or radio.

First, the server 120 will be explained. The server 120 includes a controller 121, a communicator 122, a map data storage 124 (corresponds to an "image data storage" in accordance with the present invention), and a drawing setting storage 125.

The controller 121 performs a process of sending map data stored in the map data storage 124 to the smart phone 130 by using current position information acquired from the smart phone 130 via the network 5 and the communicator 122, and performs a process of sending drawing settings stored in the drawing setting storage 125 to the smart phone 130.

The communicator 122 controls transmission and reception of data between the server and the smart phone 130 (strictly, a communicator 132 of the smart phone 130) via the network 5. More specifically, the communicator 122 transmits data from the controller 121 to the smart phone 130 via the network 5, and also receives data transmitted thereto, via the network 5, from the smart phone 130 and sends the data to the controller 121.

The map data storage 124 stores map data, and sends map data about a specified range to the controller 121 in response to a request from the controller 121. The drawing setting storage 125 stores drawing settings as shown in, for example, FIG. 3. Each drawing setting stored in this drawing setting storage 125 is read by the controller 121.

Next, the smart phone 130 will be explained. The smart phone 130 includes a controller 131, the communicator 132, a display ability storage 133, and a current position detector 136.

The controller 131 performs a navigation process by using both map data or drawing settings which are acquired from the server 120 via the network 5 and the communicator 132, and current position information acquired from the current position detector 136. Because map drawing is performed by the image display device 4, the controller 131 sends data required for map drawing to the image display device 4 via the communicator 132 and the network 6. More specifically, when a network connection with the image display device 4 is established, the controller 131 transmits the drawing settings to the image display device 4, and, when the image display device 4 draws an image, transmits the map data to the image display device 4.

The communicator 132 controls transmission and reception of data between the smart phone and the server 120 (strictly, the communicator 122 of the server 120) via the network 5, and also controls transmission and reception of data between the smart phone and the image display devices 4 (strictly, a communicator 43 of the image display device 4) via the network 6. More specifically, the communicator 132 transmits data from the controller 131 to the server 120 via the network 5, and also receives data transmitted thereto, via the network 5, from the server 120 and sends the data to the controller 131. Further, the communicator 132 transmits data from the controller 131 to the image display device 4 via the network 6, and also receives data transmitted thereto, via the network 6, from the image display device 4 and sends the data to the controller 131.

The display ability storage 133 stores the display ability of a display which the smart phone 130 has. Because an explanation about display on the display in the smart phone 130 is omitted, the display is not shown in FIG. 6. The current position detector 136 is configured with, for example, a GPS receiver and so on, and detects the current position of the smart phone 130 and sends the current position to the controller 131 as the current position information.

In the image display system in accordance with the variant of this Embodiment 1, the processing which is performed by the navigation device 2 in accordance with Embodiment 1 is shared and performed by the server 120 and the smart phone 130. As a result, the image display device 4 can implement the same functions as those in the embodiment in which the image display device is connected to the navigation device 2. At that time, a part of the processing performed in the navigation device 2 is implemented by communications between the server 120 and the smart phone 130 via the network 5. For example, the smart phone 130 transmits the current position information acquired from the current position detector 136 and the display ability stored in the display ability storage 133 to the server 120, and the server 120 sends map data corresponding to the received current position information and having a size corresponding to the display ability to the smart phone 130.

According to this configuration, the functions and data which are updated with a higher frequency than that of vehicle-mounted equipment and which exist in the server on the Internet are made to be available.

Embodiment 2

It is assumed in the image display system. 1 in accordance with above-mentioned Embodiment 1 that map data acquired from the map data storage 24 express a display area matching the screen resolution of the display of the navigation device 2, the screen resolution being stored in the display ability storage 23. In contrast with this, an image display system 1a in accordance with Embodiment 2 is configured in such a way as to transmit map data which are to be drawn in a larger display area than the screen resolution of a display of a navigation device 2 to an image display device 4, the screen resolution being stored in a display ability storage 23, but not transmit any map data when a display area corresponding to the current position falls within a range in which the transmitted map data are displayed, thereby reducing the amount of data transmitted.

Figure 7:
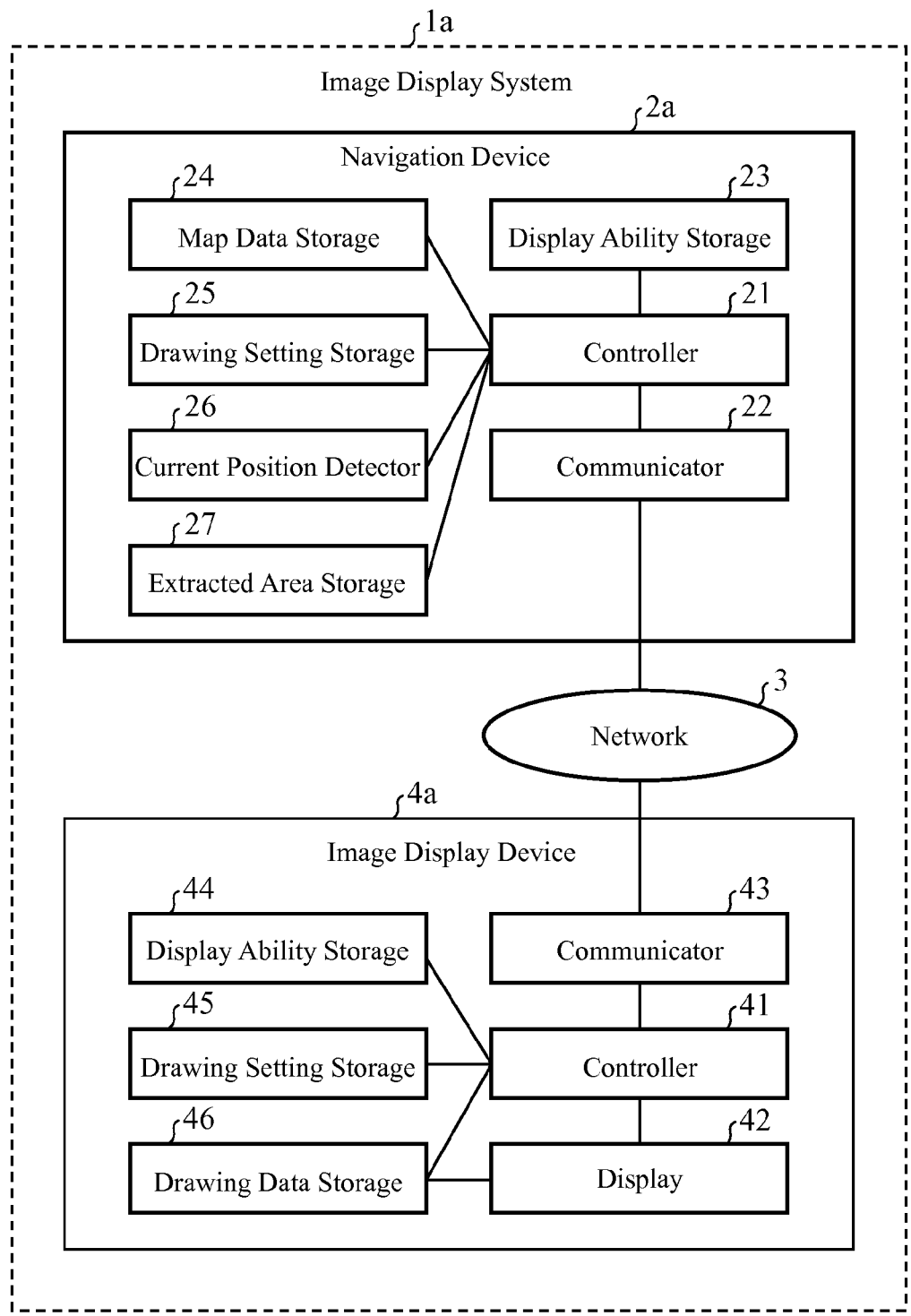
FIG. 7 is a block diagram showing the configuration of an image display system in accordance with Embodiment 2 of the present invention.

FIG. 7 is a block diagram showing the configuration of the image display system 1a in accordance with Embodiment 2 of the present invention. This image display system 1a is configured by connecting the navigation device 2a and the image display device 4a to each other via a network 3. The navigation device 2a corresponds to an image transmission device in accordance with the present invention.

The navigation device 2a includes a controller 21, a communicator 22, a display ability storage 23, a map data storage 24, a drawing setting storage 25, a current position detector 26, and an extracted area storage 27. Because the controller 21, the communicator 22, the display ability storage 23, the map data storage 24, the drawing setting storage 25, and the current position detector 26 are the same as those in accordance with Embodiment 1, the explanation of the components will be omitted hereafter.

The extracted area storage 27 stores a drawing area in which map data which the controller 21 acquires from the map data storage 24 are drawn, and the screen resolution of a screen on which a map is drawn. The drawing area and the screen resolution which are stored in this extracted area storage 27 are read by the controller 21.

The image display device 4a includes a controller 41, a display 42, a communicator 43, a display ability storage 44, a drawing setting storage 45, and a drawing data storage 46. Because the controller 41, the display 42, the communicator 43, the display ability storage 44, and the drawing setting storage 45 are the same as those in accordance with Embodiment 1, the explanation of the components will be omitted hereafter.

The drawing data storage 46 stores a map image which is drawn by using map data received, via the network 3, from the navigation device 2.

Next, the operation at the time of map drawing of the image display system 1a in accordance with Embodiment 2 configured as above will be explained. Because operations at the time when the image display system 1a is started by the turning-on of the power to the system and a connection between the navigation device 2a and the image display device 4a is established are the same as those of the navigation device 2 and the image display device 4 in accordance with Embodiment 1, the explanation of the operations will be omitted hereafter.

Figure 8:
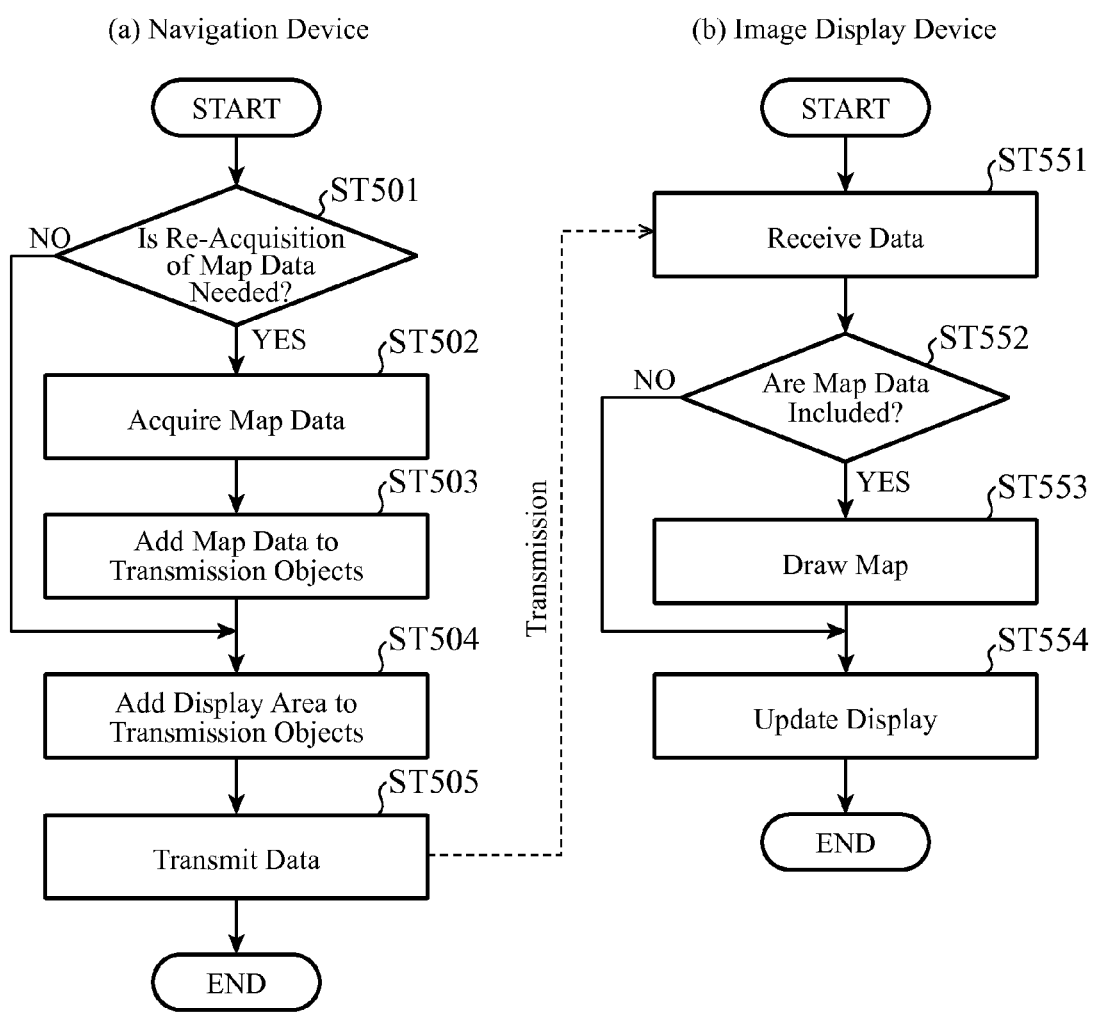
FIG. 8 is a flow chart showing an operation at the time of map drawing of the image display system in accordance with Embodiment 2 of the present invention.

FIG. 8 is a flow chart showing the operation at the time of performing map drawing of the image display system 1a after the operation at the time of turning on is completed, and shows the navigation device 2's operation of transmitting map data and a display area to the image display device 4a. A definition of the "display area" will be described below.

First, the operation of the navigation device 2a will be explained by referring to a flow chart shown in FIG. 8(a). A requirement on "start" of the processing shown in FIG. 8(a) is that current position information is sent from the current position detector 26 to the controller 21, and the controller 21 determines that the map screen displayed on the image display device 4a needs to be updated on the basis of the current position information.

When the processing is started, whether or not re-acquisition of map data is needed is checked to see (step ST501). More specifically, the controller 21 determines to which position in the drawing area the current position corresponds on the basis of the current position information sent thereto from the current position detector 26, and the drawing area and the screen resolution which are stored in the extracted area storage 27. Assuming that the current position information and the drawing area are expressed in common units (e.g., latitude and longitude), this calculation can be performed according to the following procedure.

(A) Calculate a Relative Position of the Current Position with Respect to a Specific Point in the Drawing Area.

For example, what % of the width and what % of the height the current position are displaced rightward and downward with respect to an upper left corner of a rectangular region are calculated.

(B) Multiply the Screen Resolution (Height and Width) Stored in the Extracted Area Storage 27 by the Result of (A).

Next, an area centered at the result of above-mentioned (B) and corresponding to the screen resolution stored in the display ability storage 23 is defined as the "display area", and it is determined whether this display area is contained in the drawing area or a part of the display area is not contained in the drawing area. When the display area is contained in the drawing area, the controller determines that re-acquisition of map data is "unnecessary", and advances to a process of step ST504. In contrast, when a part of the display area is not contained in the drawing area, the controller determines that re-acquisition of map data is "necessary", and advances to a process of step ST502. Hereafter, it is assumed that the screen resolution stored in the extracted area storage 27 is determined statically.

Map data are acquired in step ST502. More specifically, the controller 21 acquires map data about an area surrounding the current position from the map data storage 24 on the basis of the current position information sent thereto from the current position detector 26. At that time, the controller 21 acquires map data about an area corresponding to the screen resolution stored in the extracted area storage 27. Further, the controller 21 causes the extracted area storage 27 to store the drawing area expressed by the acquired map data.

The map data are then added to transmission objects (step ST503). More specifically, the controller 21 performs a process of determining the map data acquired in step ST502 to be a transmission object. After that, the controller advances to the process of step ST504.

In step ST504, the display area is added to the transmission objects. More specifically, the controller 21 performs a process of determining the display area calculated at the time of the process of step ST501 to be a transmission object. Data transmission is then performed (step ST505). More specifically, the controller 21 transmits both the map data which is determined, in step ST503, to be a transmission object, and the display area which is determined, in step ST504, to be a transmission object to the image display device 4*a* via the communicator 22 and the network 3.

Next, the operation of the image display device 4*a* will be explained by referring to a flow chart shown in FIG. 8(*b*). When the processing is started, data reception is performed first (step ST551). More specifically, the controller 41 receives data transmitted thereto, via the network 3 and the communicator 43, from the navigation device 2*a*.

Whether or not map data are included is then checked to see (step ST552). More specifically, the controller 41 checks to see whether or not map data are included in the data received in step ST551. When, in this step ST552, determining that map data are not included, the controller advances to a process of step ST554.

In contrast, when, in step ST552, determining that map data are included, the controller then performs map drawing (step ST553). More specifically, the controller 41 draws a map by using the map data included in the data received in step ST551. The details of this drawing process are the same as those of the processes of steps ST352 to ST356 of FIG. 5. However, the drawing destination is not the display 42, but the drawing data storage 46. After that, the controller advances to the process of step ST554.

An update of the display is performed in step ST554. More specifically, the controller 41 transmits a portion which is included in the map data drawn in the drawing data storage 46 and which is specified by the display area included in the data received in step ST551 to the display 42. As a result, the map screen is updated.

As explained above, the navigation device 2*a* of the image display system 1*a* in accordance with Embodiment 2 determines whether or not there is a necessity to acquire map data from the map data storage 23 and whether or not there is a necessity to transmit the map data to the image display device 4*a* by using the current position information, the drawing area and the screen resolution which are stored in the extracted area storage 27, and the screen resolution stored in the display ability storage 23. Further, when no map data are transmitted from the navigation device 2*a*, the mage display device 4*a* updates the map screen by using the map image stored in the drawing data storage 46 and the display area transmitted from the navigation device 2*a*. Therefore, as compared with Embodiment 1, the amount of data transmitted between the navigation device 2*a* and the image display device 4*a* can be reduced. Further, because the number of times of map drawing using the received map data is also reduced in the image display device 4*a*, the processing load on the image display device 4*a* can be reduced.

Further, although it is assumed in above-mentioned Embodiment 2 that the screen resolution stored in the extracted area storage 27 is statically determined, the screen resolution of the screen which is drawn by using the vertex string included in the map data can be configured so as to be changed dynamically on the basis of a resource allocation planning incorporated into the navigation device 2*a* and according to the resource usage status. According to this configuration, a flexible use of the resource of the navigation device 2*a* can be achieved. In this case, the resource allocation planning is a process of, in a case in which, for example, the navigation device 2*a* has functions other than the navigation function, reducing the memory amount allocated to the navigation function, or the like when a screen other than a one for navigation is displayed.

Further, although it is assumed in above-mentioned Embodiment 2 that the screen resolution stored in the extracted area storage 27 is statically determined, a screen resolution can be configured so as to be specified from the image display device 4*a* to the navigation device 2*a*. According to this configuration, the resource amount needed for the drawing data storage 46 of the image display device 4*a* (concretely, the memory amount and so on) can be adjusted.

Further, although it is assumed in above-mentioned Embodiment 2 that the screen resolution stored in the extracted area storage 27 is statically determined, the screen resolution stored in the extracted area storage 27 can also be configured so as to be determined through interaction between the navigation device 2*a* and the image display device 4*a*. For example, when the screen resolution is transmitted from the image display device 4*a* to the navigation device 2*a*, a comparison with a screen resolution which is scheduled to be used in the navigation device 2*a* can be performed in such a way that either one of the screen resolutions, e.g., a smaller one of the screen resolutions can be adopted, and the result of the comparison can be transmitted to the image display device 4*a*. By using this configuration, the resource amount as the whole of the image display system 1*a* can be adjusted.

Further, although in above-mentioned Embodiment 2 the system is configured in such a way as to, when map data are acquired from the map data storage 24, transmit all of the map data to the image display device 4*a*, when there is an area overlapping the area of the map data which are transmitted immediately before the acquisition, data transmission has needless duplication. To solve this problem, the system can be configured in such a way as to reuse a part of the map image stored in the drawing data storage 46 for the overlapping area, thereby preventing map data from being transmitted. More specifically, when transmitting the vertex string included in the image data to the image display device 4*a*, the navigation device 2*a* transmits only a portion which does not overlap the vertex string which is transmitted the last time, and, as to the overlapping portion, transmits the range of this overlapping portion and data showing an amount of movement in the drawing area to the image display device 4*a*. In other words, the navigation device 2*a* transmits data showing at which position in the map image after update the image to be reused is positioned to the image display device 4*a*. As a concrete description of the data, for example, there are provided coordinates for specifying the part to be reused (the coordinates of the following two points: the upper left and lower right points of a rectangular region) and the direction of movement of the part to be reused (a vertical direction or a horizontal lateral direction). The image display device moves the portion of the image held by the drawing data storage 46 within the image on the basis of the data showing the range and the amount of movement of the overlapping portion received from the navigation device 2*a*. By configuring the system in this way, the amount of data transmitted between the navigation device 2*a* and the image display device 4*a* can be reduced. Further, because the number of times of map drawing using the received map data is also reduced in the image display device 4*a*, the processing load on the image display device 4*a* can be reduced.

In addition, although in above-mentioned Embodiment 2 the image display device 4a is configured in such away as to transmit a part of the map image stored in the drawing data storage 46 to the display 42 at all times, a map image is not necessarily displayed at all times when the navigation device 2a has a function other than the navigation function. In such a case, the controller 41 can be configured in such a way as to, in step ST554, determine the display enable or disable flag of the map image, and temporarily store the display area included in the data received in step ST551 when the display is unnecessary, thereby omitting a change of the display contents. According to this configuration, even in a case in which the vehicle travels in a state in which no map image (map screen) is displayed, and, after that, switching to the display of a map image is performed, by using the display area stored temporarily, the display of the map can be performed without waiting for transmission of data from the navigation device 2a.

Embodiment 3

In the image display system 1 in accordance with above-mentioned Embodiment 1, drawing settings stored in the drawing setting storage 25 are transmitted to the image display device 4 when a connection between the navigation device 2 and the image display device 4 is established. Therefore, once drawing settings are transmitted to the image display device 4, there is never a time when the drawing settings are changed. In contrast with this, an image display system 1b in accordance with Embodiment 3 enables drawing settings to be changed at a time other than the time when the image display system is started, thereby improving the flexibility of the image display system.

Figure 9:
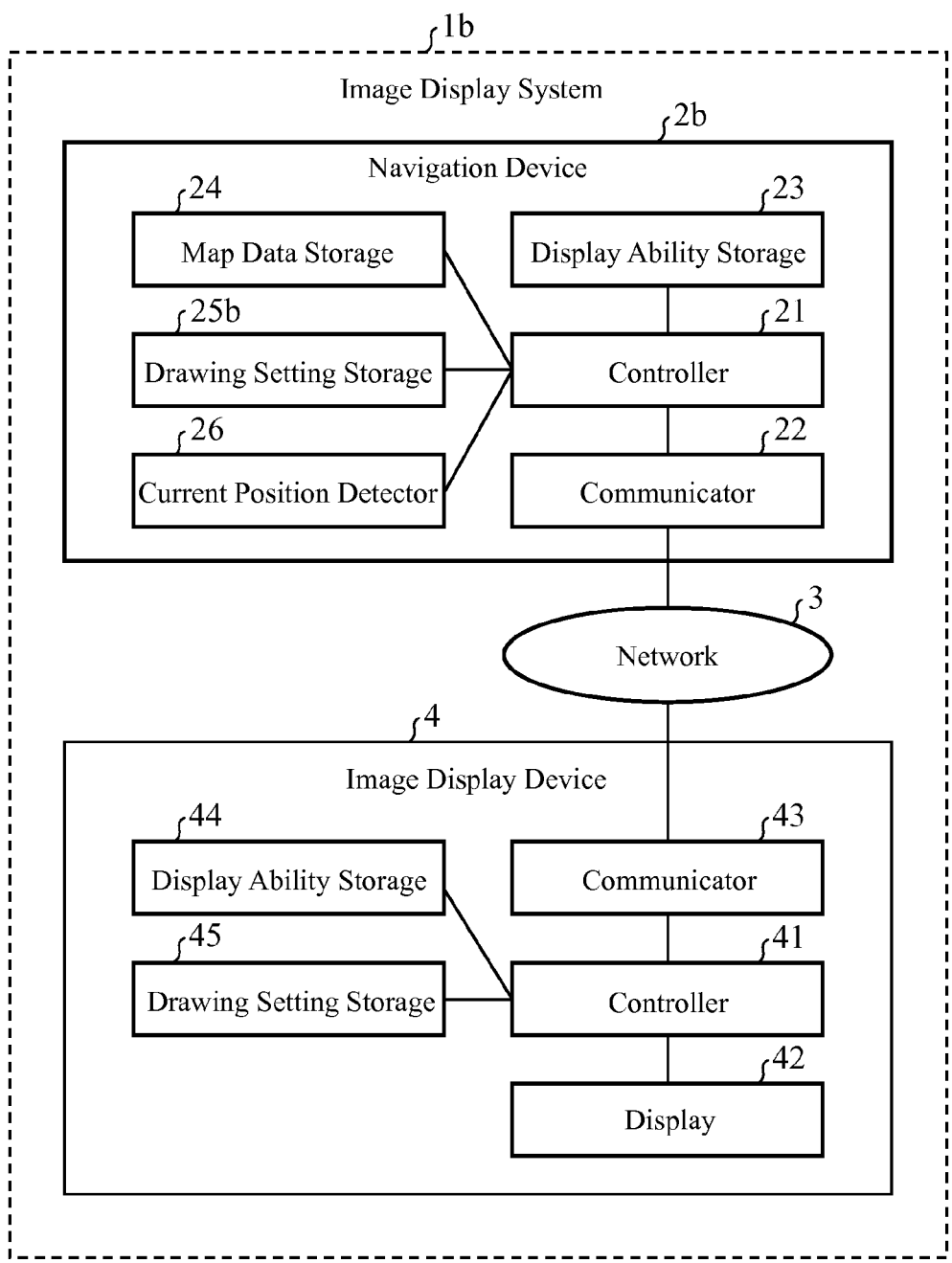
FIG. 9 is a block diagram showing the configuration of an image display system in accordance with Embodiment 3 of the present invention.

FIG. 9 is a block diagram showing the configuration of the image display system 1b in accordance with Embodiment 3 of the present invention. This image display system 1b is configured by connecting a navigation device 2b and an image display device 4 to each other via a network 3. The navigation device 2a corresponds to an image transmission device in accordance with the present invention.

The navigation device 2b includes a controller 21, a communicator 22, a display ability storage 23, a map data storage 24, a drawing setting storage 25b, and a current position detector 26. Because the controller 21, the communicator 22, the display ability storage 23, the map data storage 24, and the current position detector 26 are the same as those in accordance with Embodiment 1, the explanation of the components will be omitted hereafter.

Figure 10:
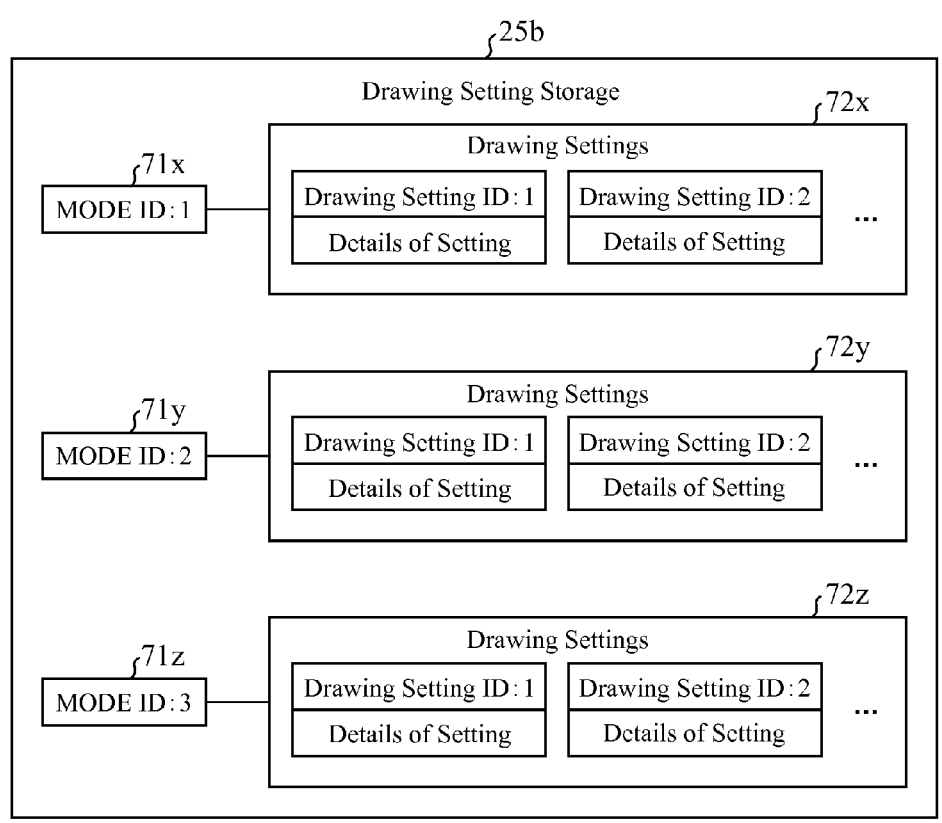
FIG. 10 is a diagram showing an example of a plurality of drawing settings stored in a drawing setting storage of the image display system in accordance with Embodiment 3 of the present invention.

The drawing setting storage 25b stores a plurality of drawing settings as explained in Embodiment 1. FIG. 10 is a diagram showing the configuration of information (the plurality of sets of drawing settings) stored in the drawing setting storage 25b. An example in which three drawing settings 72x, 72y, and 72z are stored is shown in FIG. 10. Although each of the drawing settings has the same drawing setting IDs, concrete descriptions of their respective drawing settings ("details of setting" in the figure) are not necessarily the same. Mode IDs 71x, 71y, and 71z are disposed in order to discriminate among the drawing settings, and the mode ID 71x and the drawing setting 72x, the mode ID 71y and the drawing setting 72y, and the mode ID71z and the drawing setting 72z are brought into correspondence with each other.

Next, the operation of the image display system 1b in accordance with Embodiment 3 configured as above will be explained by dividing the operation into a one at the time of turning on and a one at the time of updating drawing settings. An operation at the time of map drawing is the same as that in above-mentioned Embodiment 1.

(3-1) Operation at the Time of Turning on

Figure 11:
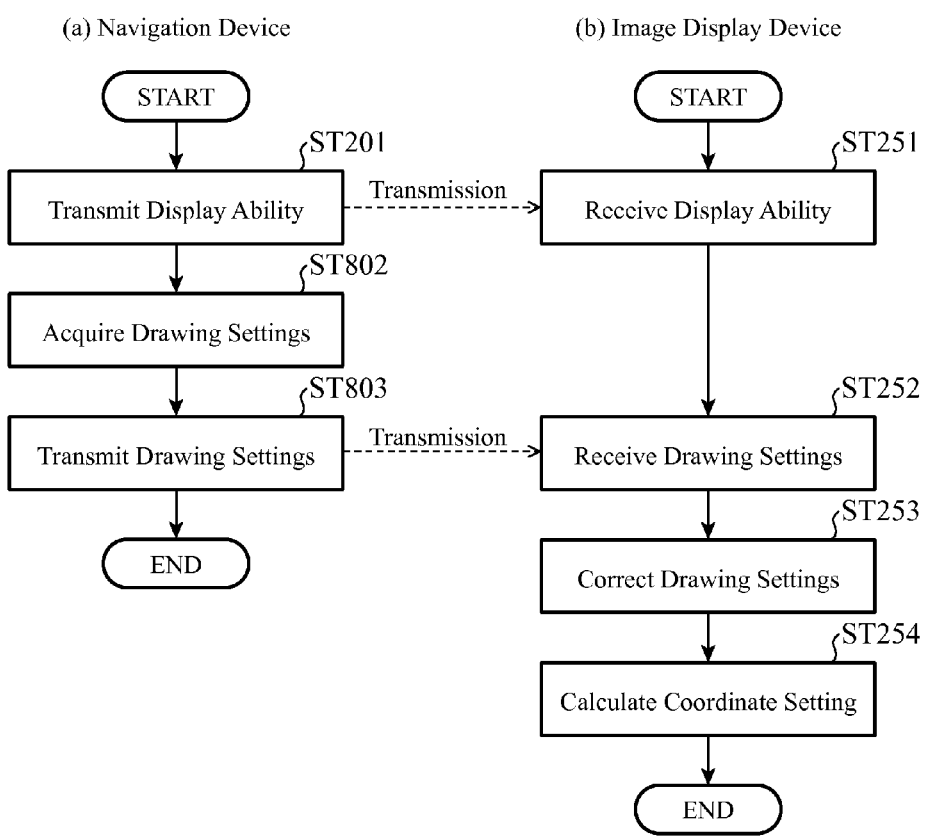
FIG. 11 is a flow chart showing an operation at the time of turning on of the image display system in accordance with Embodiment 3 of the present invention.

First, an operation at the time when the image display system 1b is started by being turned on, and a connection between the navigation device 2b and the image display device 4 is established will be explained by referring to a flow chart shown in FIG. 11.

First, the operation of the navigation device 2b will be explained by referring to a flow chart shown in FIG. 11(a). When a connection between the navigation device 2b and the image display device 4 is established by the turning-on of the power to the system, transmission of the display ability is performed (step ST201). This process is the same as that of step ST201 in the flow chart shown in FIG. 4(a).

Drawing settings are then acquired (step ST802). More specifically, the controller 21 specifies a specific mode ID to acquire drawing settings from the drawing setting storage 25b. In this embodiment, it is assumed that the controller 21 uses a fixed mode ID at the time when the system is started.

Transmission of the drawing settings is then performed (step ST803). More specifically, the controller 21 transmits the drawing settings acquired in step ST802 to the image display device 4 via the communicator 22. After the above-mentioned processes are performed, the processing in the navigation device 2b is ended.

Next, the operation of the image display device 4 will be explained by referring to a flow chart shown in FIG. 11(b). When a connection between the navigation device 2 and the image display device 4 is established by the turning-on of the power to the system, reception of the display ability is performed first (step ST251). Reception of the drawing settings is then performed (step ST252). A correction on the drawing settings is then performed (step ST253). Calculation of a coordinate setting is then performed (step ST254). These processes of steps ST251 to ST254 are the same as the processes of steps ST251 to ST254 in the flowchart shown in FIG. 4(b) with the exception that the data transmission source is changed from the navigation device 2 to the navigation device 2b.

(3-2) Operation at the Time of Updating Drawing Settings

Figure 12:
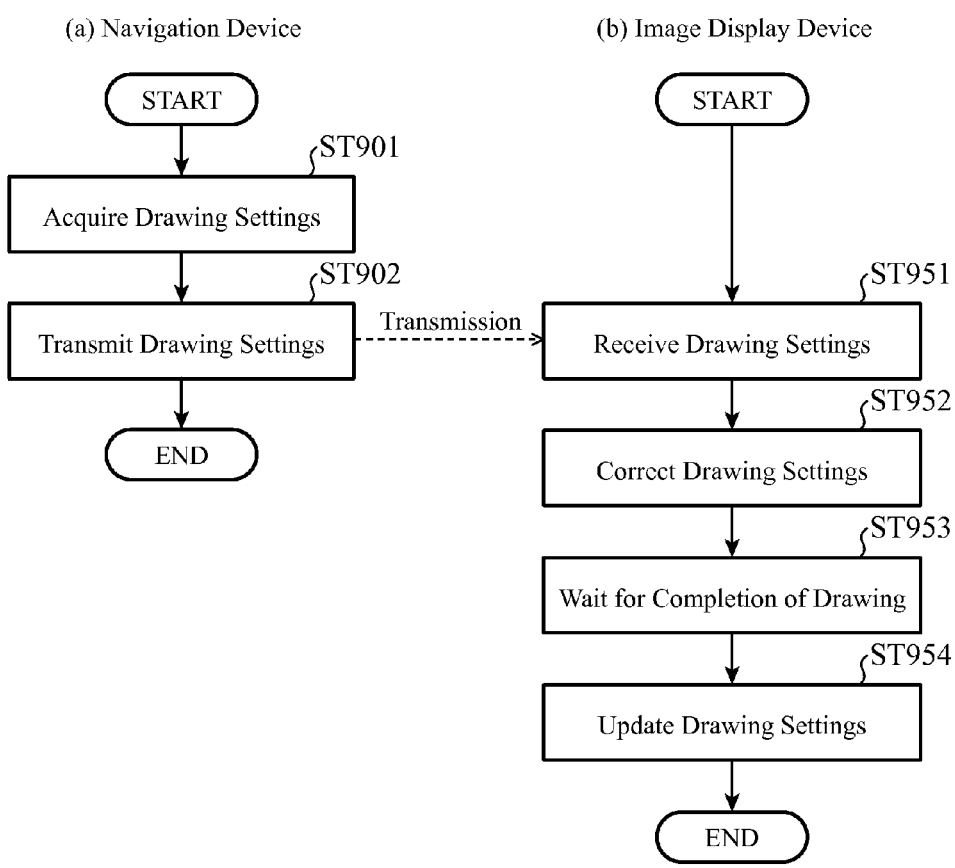
FIG. 12 is a flow chart showing an operation at the time of updating a drawing setting of the image display system in accordance with Embodiment 3 of the present invention.

Next, the operation of the image display system 1 at the time of updating drawing settings after the operation at the time of turning on is completed will be explained by referring to a flow chart shown in FIG. 12.

First, the operation of the navigation device 2b will be explained by referring to a flow chart shown in FIG. 12(a). A requirement on "start" of the processing shown in FIG. 12(a) is that the controller 21 determines that drawing settings need to be updated when triggered by an update of the time, a user input, or the like. It is further assumed that a mode ID specifying the drawing settings to be updated is provided at that time.

When the processing is started, the drawing settings are acquired (step ST901). More specifically, the controller 21 specifies a mode ID which is provided in advance like to acquire the drawing settings from the drawing setting storage 25b, as mentioned above. In this case, the drawing settings which the controller 21 acquires differ from those transmitted from the navigation device 2b when a network connection between the navigation device 2b and the image display device 4 is established.

The drawing settings are then transmitted (step ST902). More specifically, the controller 21 transmits the drawing settings acquired in step ST901 to the image display device 4 via the communicator 22 and the network 3. After the above-mentioned processes are performed, the operation of the navigation device 2b is ended.

Next, the operation of the image display device 4 will be explained by referring to a flow chart shown in FIG. 12(b). When the processing is started, the drawing settings are received first (step ST951). More specifically, the controller 41 receives the drawing settings transmitted thereto, via the network 3 and the communicator 43, from the navigation device 2, and stores the drawing settings in the drawing setting storage 45 as the "drawing settings before correction."

A correction on the drawing settings is then performed (step ST952). More specifically, the controller 41 corrects the drawing settings by using a map data provider display ability stored in the display ability storage 44, the drawing settings before correction stored in the drawing setting storage 45, and the "display ability of the image display device 4 itself" stored in advance in the drawing setting storage 45. A concrete correcting method is the same as the method explained in Embodiment 1.

Then, a standby process is performed until drawing is completed (step ST953). More specifically, the controller 41 checks to see whether or not the image display device 4 itself is performing processing shown in FIG. 5 (b), and, when the image display device is performing the processing, the controller causes this processing to pause until the processing is completed, i.e., until the processing reaches "End" of FIG. 5(b). In contrast, when the image display device is performing the processing, or when the processing is completed, the controller advances to a process of step ST954.

The drawing settings are updated in step ST954. More specifically, the controller 41 stores the drawing settings corrected in step ST952 in the drawing setting storage 45 as the "drawing settings after correction." After the above-mentioned processes are performed, the processing in the image display device 4 is ended.

As previously explained, the navigation device 2b of the image display system 1b in accordance with Embodiment 3 acquires drawing settings from the drawing setting storage 25b on the basis of a mode ID, and transmits the drawing settings to the image display device 4 via the communicator 22 and the network 3. The image display device 4 stores the drawing settings received via the network 3 and the communicator 43 in the drawing setting storage 45 and performs a correction on the drawing settings, and, after map drawing is completed, stores the corrected drawing settings in the drawing setting storage 45 to update the drawing settings. Accordingly, a change of drawing settings can be achieved at a time other than the time when the image display system is started, and, as a result, the flexibility of the image display system 1b can be improved. In addition, because only after map drawing is completed, the corrected drawing settings are stored in the drawing setting storage 45, the drawing settings can be prevented from being changed during the drawing, and hence drawing of a map different from what is expected can be prevented.

Further, although the image display system in accordance with above-mentioned Embodiment 3 is configured in such a way as to transmit all of drawing settings acquired on the basis of a mode ID to the image display device 4, the image display system can be alternatively configured in such a way as to extract the difference between the drawing settings before change and the drawing settings after change and transmit only the difference to the image display device 4. This configuration can be implemented by adding a process of storing the mode ID showing the mode currently being used and extracting the difference between the drawing settings before change and the drawing settings after change to the navigation device 2b, and adding a process of correcting and updating the drawing settings by using the received difference to the image display device 4. According to this configuration, the amount of data transmitted from the navigation device 2b to the image display device 4 can be reduced. As long as there is a partial difference for each drawing setting ID, all of the setting information shown by the drawing setting ID can be transmitted as the difference or a difference can be extracted for each item of the setting information.

Further, although the image display system in accordance with above-mentioned Embodiment 3 is configured in such a way as to store the mode ID showing the mode currently being used, the image display system can be alternatively configured in such a way that when there are two or more image display devices connected to the navigation device 2b, the navigation device 2b separately stores a mode ID (drawing settings) which each of the image display devices is using. According to this configuration, the image display devices are enabled to use different display settings, and drawing settings using a difference can be transmitted to each of the image display devices.

In addition, the operation of updating drawing settings which is explained in this Embodiment 3 can also be applied to Embodiment 2. However, because the image display device 4a stores a map screen in the drawing data storage 46 in Embodiment 2, the map screen does not necessarily vary promptly even if the drawing settings are changed. Concretely, when the next map screen is drawn, this map screen displayed is based on the drawing settings after change. However, by configuring the system in such a way that after transmission of drawing settings, the navigation device 2b transmits the vertex string included in the map data (image data) and information for instructing the area to be displayed in the screen drawn by the vertex string to the image display device 4a, the changed drawing settings can be reflected in the map screen promptly.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The present invention can be used for, for example, a car navigation system or the like that enables the user to view a map or a content other than a map which is displayed in such a way as to be legible to the user, in each of image display devices which a plurality of users have, respectively.

EXPLANATIONS OF REFERENCE NUMERALS 1, 1a, and 1b image display system, 2, 2a, and 2b navigation device, 3 network, 4 and 4a image display device, 21, 121, and 131 controller, 22, 122, and 132 communicator, 23 and 133 display ability storage, 24 and 124 map data storage, 25, 25b, and 125 drawing setting storage, 26 and 136 current position detector, 27 extracted area storage, 41 controller, 42 display, 43 communicator, 44 display ability storage, 45 drawing setting storage, 46 drawing data storage, 120 server, and 130 smart phone.

The invention claimed is:

1. An image display system in which an image transmission device and an image display device are connected to each other via a network,
wherein said image transmission device
transmits drawing settings for specifying individual methods of drawing components of an image when a network connection with said image display device is established,
determines, after transmission of the drawing settings, whether the image display device needs to display an image, and
transmits image data including data for drawing the component of said image and also including an identifier for specifying a drawing setting applied to said component when said image display device needs to display said image,
wherein said image display device
receives said drawing setting from said image transmission device,
corrects said received drawing setting on a basis of both a display ability of said image transmission device and its own display ability,
receives said image data from said image transmission device, and
draws and displays the image by using one of said corrected drawing settings, which corresponds to the identifier included in the received image data, and
wherein said image transmission device is configured to:
store parameters defining a drawing area in which said image data are drawn and a screen resolution of a drawn screen,
calculate a current position in said drawing area based on said screen resolution, and a display area corresponding to a screen resolution of said image transmission device that is centered at said current position,
determine whether said display area is contained within said drawing area, and
when said determination indicates that said display area is not contained in said drawing area, transmit both said image data which said image transmission device acquires and data of said display area to said image display device, thus causing said image display device to display an image in an area corresponding to said display area.

2. The image display system according to claim 1, wherein said image transmission device dynamically changes said screen resolution of the drawn screen according to a resource use status thereof.

3. The image display system according to claim 1, wherein said screen resolution of the drawn screen is specified by said image display device.

4. The image display system according to claim 1, wherein said image transmission device selects either one of a screen resolution specified by said image display device and said screen resolution of the drawn screen stored therein, and transmits the screen resolution selected thereby to said image display device.

5. The image display system according to claim 1, wherein when transmitting data for drawing the component of said image included in said image data to said image display device, said image transmission device transmits only a portion not overlapping data for drawing the component of said image which is transmitted last time, and, as to a portion overlapping the data which is transmitted last time, transmits both a range of this portion and data showing an amount of movement in the drawing area, and wherein said image display device includes a drawing data storage to store the image which is drawn by using said image data received from said image transmission device, and moves a portion of the image held in said drawing data storage within the image on a basis of the range of the overlapping portion and the data showing the amount of movement which are received from said image transmission device.

6. The image display system according to claim 1, wherein said image display device stores said display area received from said image transmission device and omits a change of display contents when the image currently being displayed thereby is other than a map image.

7. An image display system in which an image transmission device and an image display device are connected to each other via a network,
wherein said image transmission device
transmits drawing settings for specifying individual methods of drawing components of an image when a network connection with said image display device is established,
determines, after transmission of the drawing settings, whether the image display device needs to display an image, and
transmits image data including data for drawing the component of said image and also including an identifier for specifying a drawing setting applied to said component when said image display device needs to display said image,
wherein said image display device
receives said drawing setting from said image transmission device,
corrects said received drawing setting on a basis of both a display ability of said image transmission device and its own display ability,
receives said image data from said image transmission device, and
draws and displays the image by using one of said corrected drawing settings, which corresponds to the identifier included in the received image data,
wherein said image transmission device stores a plurality of drawing settings and transmits a drawing setting which is included in said plurality of drawing settings and which is different from said drawing setting transmitted when the network connection with said image display device is established to said image display device, and wherein said image display device corrects the drawing setting different from said drawing setting transmitted when the network connection with said image display device is established on a basis of the display ability of said image transmission device and its own display ability, and updates said drawing setting corrected thereby to a new drawing setting, and
wherein said image transmission device transmits, as said drawing setting which is to be transmitted to said image display device, a difference between a drawing setting which is transmitted last time and the drawing setting which is to be transmitted this time, and wherein said image display device updates said drawing setting by using said difference between the drawing settings received from said image transmission device.

* * * * *